UNITED STATES PATENT OFFICE.

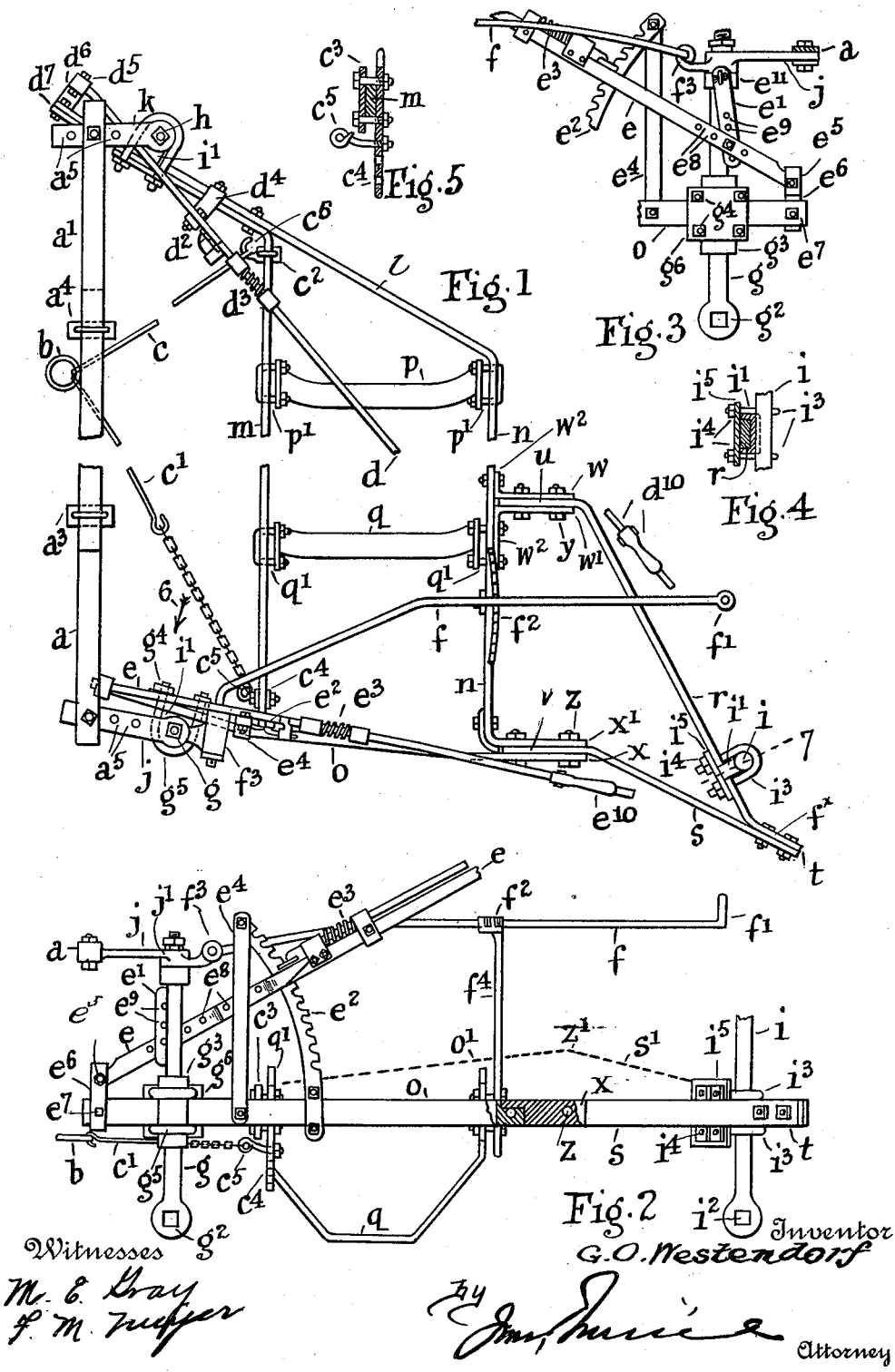

GEORGE OSCAR WESTENDORF, OF WINIAM, VICTORIA, AUSTRALIA.

DISK PLOW AND CULTIVATING IMPLEMENT.

1,008,759.  Specification of Letters Patent.  Patented Nov. 14, 1911.

Application filed July 26, 1911. Serial No. 640,670.

*To all whom it may concern:*

Be it known that I, GEORGE OSCAR WESTENDORF, a subject of the King of Great Britain and Ireland, &c., residing at Winiam, in the State of Victoria, Commonwealth of Australia, have invented certain new and useful Improvements in Disk Plows and Cultivating Implements; and I do hereby declare the following to be a full, clear, and exact description of the invention, such as will enable others skilled in the art to which it appertains to make and use the same.

This invention relates to agricultural implements, chiefly disk plows and cultivators with frames consisting of a front and a rear part jointed together to allow of rise of the frame intermediately by the operation of the joints when hard ground or an obstruction forces the disks to rise, the implement wheels retaining ground contact.

The present improvements relate to framing and adjustable parts whereby to add to the efficiency of the implement.

In the accompanying drawings showing my improvements Figure 1 is a plan of part of a frame of a disk plow or cultivating implement. Fig. 2 is a side elevation partly sectional, and Fig. 3 is an elevation of parts in Fig. 1 looking in the direction of arrow 6. Fig. 4 is a side view in section through line 7 of Fig. 1, and Fig. 5 is an elevation in vertical section of an adjustable draft connection to a beam.

For simpler illustration some of the parts which are not new are not shown, as wheels, disks, disk spindles, the driver's seat and so forth.

Although the illustrations show a frame with standards for three ground wheels, the number of the wheels may be increased, as by having two rear ones each with a standard on suitable parts of the rear of the frame, the said frame being there extended to project at one side of the implement front.

The implement framing has at one side a bar or beam $o$ with rear $x$; and a beam $s$ with front $v$, a pivot bolt at $z$ extends through these beams, or any suitable joint is provided. The frame is made angular, and formed in two sections. The rear section projects considerably to one side of the front section as indicated in Fig. 1. The front section includes a beam 1, having a transverse portion $n$, the rear end $x^1$ of which is bent rearwardly. The rear section includes an inclined beam $r$ having its front end bent forwardly as at $u$, and its opposite end extending rearwardly as at $f^x$. The forwardly projecting ends of the rear section are secured between checks on the front section, and are pivoted thereto by bolts $y$ and $z$. Cheeks $x$, $x^1$ thus inclose the front of beam $s$, and cheeks $w$, $w^1$ the front of beam $r$, each cheek $w$, $w^1$, being part of an angular bracket $w^2$ bolted to beam $n$. Between side bars $o$, $l$, and parallel to beam $n$ is a front transverse beam $m$.

Any suitable hangers or bearers are provided as part of supporting means for disks or cultivating members of which there may be one or more rows. Thus there are shown two bearers $p$, $q$; one (near bar $o$) or more additional ones used in practice not being illustrated. Between parts $m$ and $n$, I thus locate a series of disks. $p^1$, $q^1$, are adjustable clamps by which hangers $p$, $q$, can be set at any suitable distances from sides $l$, $o$, and raised to any desired heights. $b$, $c$, $c^x$ indicate any appropriate draft connections. Adjustment means are provided so that the rear of the draft connections may be set nearer to or farther from side bars $o$, $l$, at will, as plates $c^3$, $c^4$ (see Fig. 5) bolted together upon beam $m$, there being a hook $c^5$ passing through any of a series of holes in one plate as $c^4$.

I may use as shown near beam 1, a U shaped clip $c^2$ with limbs inclosing beam $m$, and projecting through a flat shank of a hook $c^6$ and fastened as by nuts underneath. In each case the hook with connected parts is slidable along beam $m$ and can be fixed, where required, by the nuts. Dotted lines $o^1$, $s^1$ indicate a raised position of the members $o$, $s$, with joint $z$ raised to point $z^1$. To return the parts to the normal position shown in full lines, spring means (not shown) may be provided, or weights on framing or beams.

To raise or lower the implement frame I provide a frame adjusting lever on each side each with a spring catch (or suitable) handle, as lever $e$ with handle $e^{10}$ and a lever $d$ with handle $d^{10}$ (not shown in Fig. 2). $e^3$, $d^3$ indicate the springs, and $e^2$, $d^2$ racks with which the lever catches engage. The racks have any suitable supports on the framing as arms $e^4$, $d^4$. Either side of the frame can be separately raised or lowered by its lever to any suitable extent, so lifting the disks clear of the ground when required. These levers are fulcrumed on connections to, in each case, a link as $e^1$ which hangs vertically or at a slight angle to vertical from a lug or collar $e^{11}$ attached to the standard as $g$. Each link is adjustable; the lever fore ends project in front of these links and are pivoted to connections forward of the implement wheel standards. Thus the front of lever $e$ is connected as by bolt $e^5$ to a strap or lug $e^6$ upon the forwardly projecting front $e^7$ of frame side $o$. Adjustment arrangements are used with lever $d$ like those shown in Fig. 3, described in this specification relatively to lever $e$,—$d^5$, $d^6$, and $d^7$ corresponding to $e^5$, $e^6$, and $e^7$.

Any suitable holes will be used in effecting a connection by which to fulcrum the levers, the fulcrum pin thus passing through one of the holes $e^8$ in lever $e$, and one of the holes $e^9$ in the fulcrum link $e^1$.

$f$ is a steering lever with end or handle $f^1$ which like the other handles aforesaid will be accessible to a driver when he is seated at the implement rear. Lever $f$ can be set in a rack or the like $f^2$ on post $f^4$ its fore end being set in a tubular or hollow boss $f^3$ or bearing projecting from the rear of an arm $j$ which is mounted upon, as by having eye $j^1$, and projects from, the upper part or end of wheel standard $g$. The eye or socket $j^1$ has a square aperture fitting on a squared top of the standard, or is suitably arranged to cause rotation of the socket to rotate the standard so that lever $f$ steers the wheel of the said standard. It will also at the same time steer the front wheel on standard $h$ by reason of the connections next mentioned.

Standards $g$, $h$, have similar bars $j$ and $k$, connected as by an adjustable bar, or two bars $a$, $a^1$ adjusted relatively to one another by clamps or the like $a^3$, $a^4$ Fig. 1, so that I may set the front of arm $j$ at a predetermined distance from that of arm $k$, each arm having holes $a^5$ or means by which to attach (as by nuts and bolts) the outer ends of bar or bars $a$, $a^1$, more to the front or rear at will. Arms $j$ and $k$ are fixed upon the standards so that the adjusting of those arms adjusts standards $g$, $h$, and therefore the implement wheels secured thereto. Slight differences in the positions in which the standards are set relatively to one another and to the frame make a great difference in working. Each standard, but especially that of the rear wheel, is thus made rotatable and will be set in a suitable position and secured. All the standards have cylindrical stems to turn in and move through bearings, and have bases, as $g^2$, $i^2$, to receive the wheel connections, $i$ being the rear standards. Each standard is adjustable along the implement framing to which it is attached. The front wheel standards are set in relative working positions by moving either or both more to the front or rear (farther from or nearer to the disks), as by operating nuts $g^4$ on U-shaped bolts $g^5$. $g^6$ is a plate through which bolts $g^5$ pass and there is a collar $g^3$ through which each front standard loosely passes.

A bearing block $l^1$ see Fig. 4, having at its top and base a flange to come respectively over and under a beam, is fitted against each beam $o$, $r$, and $l$. Each block has a concave bearing surface. This surface fits hard against the rear standard but in the case of standards $g$, $h$, it fits against collar $g^3$ which allows the lever $e$ or $d$ to operate its standard freely. The block cannot rise or fall from the beam but can slide along with its standard when the latter is adjusted. Any suitable means of clamping to the beam are used as U-shaped bolts $i^3$ held by nuts $i^4$ screwed against plates $i^5$.

What I claim Letters Patent for United States is:—

1. In an agricultural machine, the combination of a frame composed of front and rear sections, pivotal connections between said front and rear sections, means for limiting the downward movement of the adjacent pivoted ends of said sections, a bearing on the rear section, a vertical shaft mounted in the bearing to form a support for a rear wheel, a bearing located on each side of the front section, rotary wheel supporting shafts mounted in said latter bearings, an arm secured to each of said latter rotary shafts, rods connecting said arms, an operating lever secured to one of said rotary shafts, whereby to simultaneously turn both said shafts, a lifting lever pivoted on each side of the front section, each lifting lever having a series of openings, links pivotally connecting the lifting levers with the rotary shafts, each of said links having openings to coöperate with the pivots and the openings in the lifting levers to adjust the movement, and locking devices coöperating with the lifting levers for locking the parts in adjusted position.

2. In an agricultural machine, the combination of a frame composed of front and rear sections, the front section including side and rear members, the rear member having one end bent parallel with the side member and spaced therefrom to form a seat, two angular spaced apart clips forming a seat, said clips secured to the rear member in transverse alinement with the bent end of said rear member, the rear section comprising bars having their ends projecting forwardly and fitting in the seats on the rear member of the front section, pivot bolts securing the projecting ends of the rear section in the seats, means in each seat forward of the pivot bolts for limiting the downward movement of the meeting ends of the front and rear sections, a rotary standard secured to the rear section to support a wheel, a standard on each side of the front section to support wheels, means connected to said standards and the front sections for raising or lowering the frame, and means for simultaneously turning both rotary standards.

In witness whereof I have hereunto set my hand in the presence of two witnesses.

GEORGE OSCAR WESTENDORF.

Witnesses:
ARTHUR SPENCE RUSDEN,
HAROLD RICHARD TARKINSON.

Copies of this patent may be obtained for five cents each, by addressing the "Commissioner of Patents, Washington, D. C."